United States Patent [19]

Arai

[11] Patent Number: 5,945,669
[45] Date of Patent: Aug. 31, 1999

[54] LASER SCAN MICROSCOPE AND LIGHT-MEASURING APPARATUS

[75] Inventor: Yujin Arai, Akiruno, Japan

[73] Assignee: Olympus Optical Co., Ltd., Tokyo, Japan

[21] Appl. No.: 08/921,866

[22] Filed: Aug. 22, 1997

[30] Foreign Application Priority Data

Aug. 27, 1996 [JP] Japan .................................. 8-224780

[51] Int. Cl.⁶ .................................................. H01J 40/14
[52] U.S. Cl. ................ 250/234; 250/201.1; 250/214 AG
[58] Field of Search ............................. 250/234, 201.1, 250/201.2, 201.3, 201.7, 214 AG, 207

[56] References Cited

U.S. PATENT DOCUMENTS

| | | | |
|---|---|---|---|
| 3,714,441 | 1/1973 | Kreda | 250/207 |
| 3,927,938 | 12/1975 | Seigenji | 355/38 |
| 4,745,273 | 5/1988 | Szabo et al. | 250/207 |
| 5,262,635 | 11/1993 | Curbelo | 250/214 R |
| 5,726,438 | 3/1998 | Le Marchand | 250/207 |

FOREIGN PATENT DOCUMENTS 5-336405  12/1993  Japan .
6-303506  10/1994  Japan .
8-160304   6/1996  Japan .

OTHER PUBLICATIONS

Photomultiplier Tube; Hamamatsu Photonics Co., Ltd. 1993; Catalog No. TOTH9001J01.

*Primary Examiner*—Edward P. Westin
*Assistant Examiner*—Thanh X. Luu
*Attorney, Agent, or Firm*—Frishauf, Holtz, Goodman, Langer & Chick, P.C.

[57] ABSTRACT

A laser scan microscope irradiates a sample with a laser beam while simultaneously scanning the laser beam over the sample, and processes an optical signal obtained thereby so as to obtain image data. The laser scan microscope is provided with a photoelectric converting unit, a sensitivity adjuster, and a sampling/converting unit. The photoelectric converting unit converts an optical signal from the sample into an electric signal. The sensitivity adjuster adjusts the sensitivity of the photoelectric converter such that an output value of the photoelectric converting unit becomes closer to a predetermined reference value. The sampling/converting unit samples sensitivity information determined for the photoelectric converter, in accordance with a scanning speed, and converts the sampled sensitivity information into a light measurement value used for obtaining the image data.

10 Claims, 4 Drawing Sheets

LASER SCAN MICROSCOPE AND LIGHT-MEASURING APPARATUS

BACKGROUND OF THE INVENTION

The present invention relates to a laser scan microscope for forming an image of a sample on the basis of density information obtained by two-dimensionally scanning a sample by means of a finely-focused or point-illuminating laser beam. The present invention also relates to a light-measurement apparatus which can be incorporated in the photoelectric conversion section of the laser scan microscope.

A laser scan microscope irradiates a sample with a point-illuminating laser beam while simultaneously scanning the laser beam over the sample in X-axis and Y-axis directions by means of an object lens. The transmitted light, reflected light and fluorescent light coming from the sample are made to pass through the object lens and an optical system of the microscope, and are then detected by a detector, thereby obtaining the density information on the two-dimensional image.

The laser scan microscope forms an image representing the two-dimensional distribution of the density information with reference to the X-Y scan positions, and displays that image on the screen of a CRT display as a luminescent spot distribution. A confocal laser scan microscope is one type of the laser scan microscope. The confocal laser scan microscope comprises a diaphragm arranged at a position which is conjugate with respect to the sample of a detection optical system and having an aperture which is smaller than the diffraction limit of illumination light or measurement light.

A typical structure of a detection system employed in a laser scan microscope will be described. The detection system comprises a detector for photoelectrically converting light coming from a sample, such as transmitted light, reflected light and fluorescent light, into an electric signal. The detector is made of a photodiode, a photomultiplier, or the like and is designed to have appropriate sensitivity. An output voltage (current) signal which is produced from the detector in accordance with the amount or intensity of light is supplied to an amplifier, for amplification.

An output signal of the amplifier includes two kinds of components: an offset component which takes a constant value without reference to the position of an image (such as background light and an electrical offset); and a signal component which varies in accordance with a light intensity distribution. The former component is removed from the output signal by an offset subtraction circuit since it is often the cause of a narrow dynamic range in measurement. The latter component is converted into digital data by an A/D converter circuit, and the resultant digital data is stored in a memory and used as a measurement value.

Image data obtained in this manner represents a light intensity and a light intensity distribution. To be more specific, the density of the image indicates the intensity of an output signal, i.e., the intensity of the detected light, while the two-dimensional components of the image indicates the distribution of the light intensity.

In this type of laser scan microscope, a variety of measurement parameters, such as the sensitivity of the detector, the amplification factor of the amplifier, and the offset amount of the offset subtraction circuit, have to be properly adjusted to produce an image with optimally sharp contrast. If this adjustment is not properly made, various problems are brought about. For example, if the offset amount is not appropriately adjusted, the offset component may correspond to most of the dynamic range of the A/D converter circuit. Conversely, even the signal component may be removed from the image signal.

If the sensitivity of the photoelectric converter and the amplification factor of the amplifier are too high or large, the signal may exceed the upper limit of the dynamic range of the A/D converter circuit, resulting in saturation; conversely, if they are too low or small, the amplitude of the signal may be so low that an image showing a subject under measurement may not be formed.

In the conventional laser scan microscope, therefore, the measurement parameters have to be adjusted one by one while simultaneously looking at the image that is being formed at the time.

However, this adjustment method is disadvantageous in that a long time is required for completing the adjustment of all parameters. In addition, the adjustment requires a certain degree of skill. For example, when the fluorescent light coming from a sample is measured, the measurement parameters have to be adjusted in a short time. If this adjustment is not made in a short time, the sample under measurement may be damaged in the meantime, in addition, the throughput of the measurement may be lowered.

Jpn. Pat. Appln. KOKAI Publication No. 8-160304 discloses a technique for automatically optimizing measurement parameters. According to this publication, a sample is measured in the state where the sensitivity of a photoelectric converter, the amplification factor of an amplifier and the offset amount of an offset subtraction circuit are set to be appropriate, and the resultant measurement data is used to obtain optimal parameters. Although this method offers a comparatively short measurement time and variations in measurement data can be suppressed, a certain time is inevitably required before the start of actual measurement. In addition, the sample may be damaged before it is actually measured.

Jpn. Pat. Appln. KOKAI Publication No. 6-303506 discloses a technique for producing a contrast emphasis effect, a correction effect or the like by varying measurement parameters in synchronism with the sampling clocks, i.e., by dynamically varying the measurement parameters for each of the pixels of the image. However, even the technique of the reference does not eliminate the need to predetermine parameter values and desirable positions. It is not possible for the technique of the reference to determine optimal values unless an image is formed and measured.

BRIEF SUMMARY OF THE INVENTION

The present invention has been developed in consideration of the above circumstances, and an object of the present invention is to provide a laser scan microscope capable of forming an image having a satisfactorily-sharp contrast and a wide dynamic range without the necessity of executing the setting of a variety of measurement parameters that adversely affect the quality of an image of an object under measurement. Another object of the present invention is to provide a light-measuring apparatus to be incorporated in the laser scan microscope.

The present invention has been developed in an effort to achieve these objects. According to one aspect of the present invention, there is provided a laser scan microscope which irradiates a sample with a laser beam while simultaneously scanning the laser beam over the sample and processes an optical signal obtained thereby so as to obtain image data, and which comprises:

photoelectric converting means for converting an optical signal from the sample into an electric signal;

sensitivity adjusting means for adjusting sensitivity of the photoelectric converting means such that an output value of the photoelectric converting means becomes closer to a predetermined reference value; and means for sampling sensitivity information determined for the photoelectric converting means, in accordance with a scanning speed, and for converting sampled sensitivity information into a light measurement value used for obtaining the image data.

According to the second aspect of the present invention, there is provided a light-measuring apparatus which comprises:

photoelectric converting means for converting an optical signal into an electric signal;

sensitivity adjusting means for adjusting sensitivity of the photoelectric converting means such that an output value of the photoelectric converting means becomes closer to a predetermined reference value; and means for converting sensitivity information determined for the photoelectric converting means into a light measurement value used for obtaining image data.

With this structure, the sensitivity or amplification factor of the photoelectric converting means is controlled to be low or small when the optical intensity of signal light is high, and is controlled to be high or large when that optical intensity is low. Since, therefore, the sensitivity of the photoelectric converting means corresponds to the light intensity of the signal light, the information on that sensitivity can be converted into a light measurement value corresponding to density information, by referring to the reference value mentioned above.

Accordingly, the structure described above enables reliable formation of an image having a satisfactorily-sharp contrast and a wide dynamic range, and a troublesome setting operation need not be performed in forming that image.

It is desirable that the sensitivity adjustment means comprise reference value signal generating means and that this reference value signal generating means generate a reference value that permits the sensitivity of the photoelectric converting means to fall within such a range that a relationship between a voltage applied to the photoelectric converting means and a voltage output from the photoelectric converting means is depicted as being linear.

It is also desirable that the sensitivity adjusting means include a feedback circuit for comparing an output value of the photoelectric converting means with a reference value, and for controlling a voltage applied to the photoelectric converting means based on the comparison.

It is further desirable that the means for converting the sensitivity information into the light measurement value use a signal corresponding to the voltage applied to the photoelectric converting means as sensitivity information, and that this sensitivity information be converted into a light measurement value used for forming the image data.

In addition, it is desirable that the means for converting the sensitivity information into the light measurement value further use a signal corresponding to the voltage output from the photoelectric converting means as sensitivity information.

Moreover, it is desirable that the means for converting the sensitivity information into the light measurement value include a voltage detecting circuit for detecting an output voltage from a higher-potential power supply, an A/D converting circuit for performing A/D conversion with respect to the voltage detected by the voltage detecting means, and processing means for sampling voltage data output from the A/D converting means and for converting the sampled voltage data into a measurement value representing a relative amount of light, on the basis of the reference value.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Preferred embodiments of the present invention will now be described with reference to the accompanying drawings.
(First Embodiment)

Figure 1:
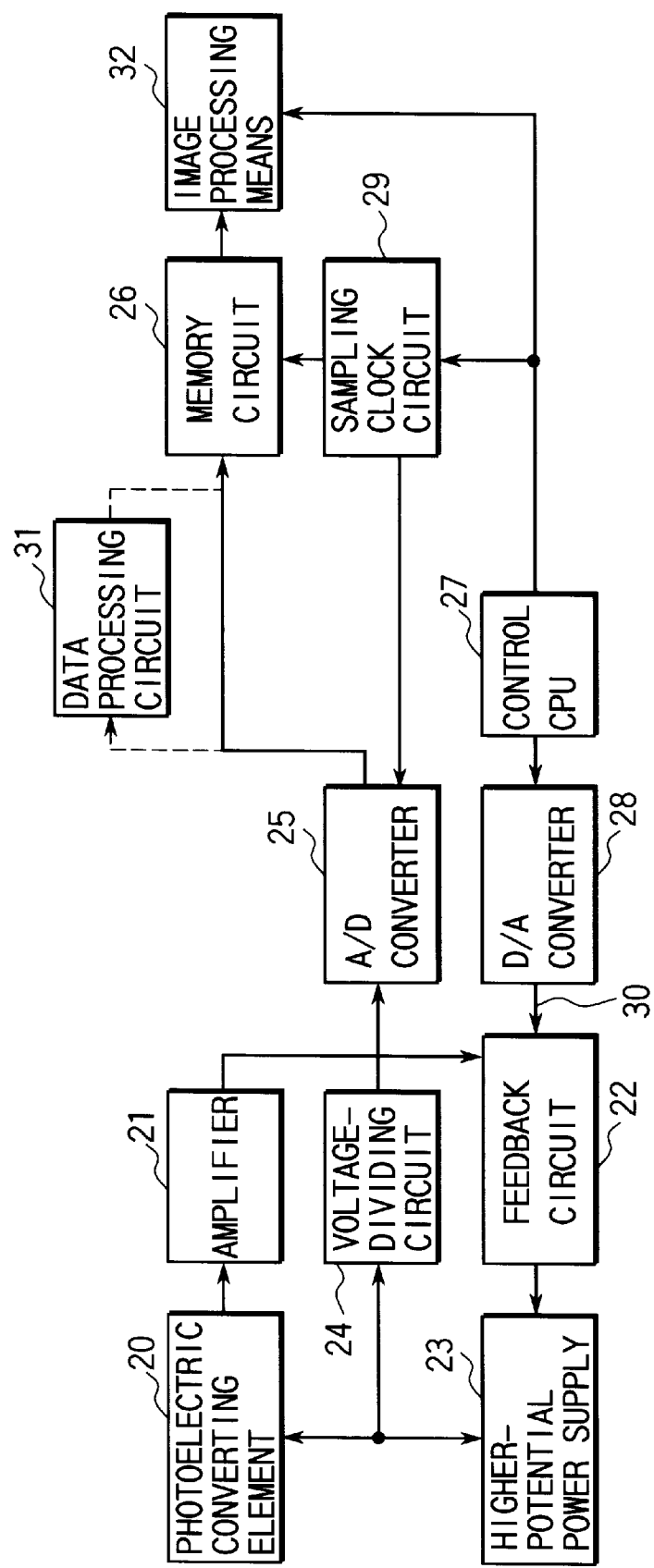
FIG. 1 is a block circuit diagram of a light-measuring circuit incorporated in a confocal laser scan microscope according to the first embodiment of the present invention.
Figure 2:
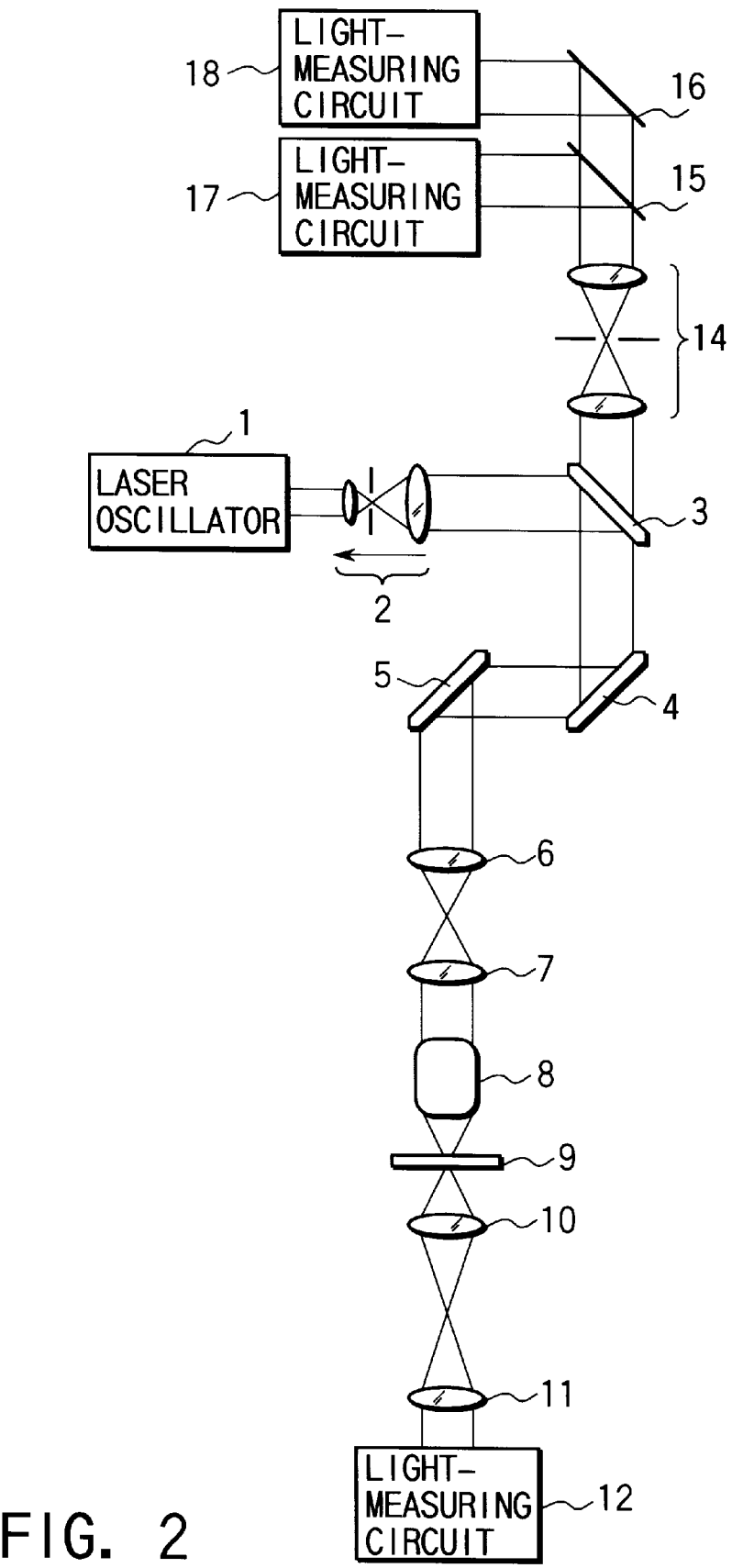
FIG. 2 shows the entire confocal laser scan microscope according to the first embodiment.

The first embodiment is an embodiment wherein the light-measuring apparatus shown in FIG. 1 is applied to the confocal laser scan microscope shown in FIG. 2.

First, a description will be given of the structure of the confocal laser scan microscope, with reference to FIG. 2.

In FIG. 2, reference numeral 1 denotes a laser oscillator. The illuminating light emitted from the laser oscillator 1 passes through a beam expander 2, and its traveling direction is changed by an optical path-splitting element 3, which is constituted by a beam splitter or a dichroic mirror. Thereafter, the illuminating light is incident on X- and Y-direction scanners 4 and 5, which are constituted by galvanometer scanners. By means of the X- and Y-direction scanners 4 and 5, the illuminating light is made to pass through a pupil projecting lens 6, an image-formation lens 7 and an object lens 8 and fall on a sample 9. The X- and Y-direction scanners 4 and 5 also serve to scan the illuminating light over the sample in the X and Y directions.

The light transmitted through the sample 9 (transmission light) travels through a collector lens 10 and a relay lens 11, and is then detected by a light-measuring circuit 12 used for the detection of transmission light. The light reflected by the sample 9 and/or fluorescent light travels to the optical path-splitting element 3 by way of the same optical path as that of the illuminating path, and is transmitted through the optical path-splitting element 3. The reflected light transmitted through the optical path-splitting element 3 is guided to a confocal optical system 14. The reflected light output from this optical system 14 is split into two components different in wavelength by means of a light-splitting means 15, which is made of a dichroic mirror, for example. The two light components are guide to light-measuring circuits 17 and 18, respectively.

Next, a description will be given of the structures of the light-measuring circuits 12, 17 and 18, with reference to FIG. 1. Since these three circuits are basically the same in circuit configuration, the following descriptions will be given on the assumption that they have the same circuit configuration.

In the light-measuring circuit, an output from a photoelectric conversion element 20 is amplified by an amplifier 21, and is then supplied to a feedback circuit 22. This feedback circuit 22 generates a sensitivity setting signal which is so controlled as to permit a photoelectric conversion output to correspond to a reference signal 30. The sensitivity setting signal is supplied to a higher-potential power supply 23. The reference signal 30 is generated by converting a digital signal, supplied from a control CPU 27 to a D/A converter 28, into an analog signal.

On receiving the sensitivity setting signal from the feedback circuit 22, the higher-potential power 23 determines a sensitivity setting voltage to be applied to the photoelectric conversion element 20, in accordance with the sensitivity setting signal. A voltage-dividing circuit 24 detects a voltage corresponding to the sensitivity setting voltage applied to the photoelectric conversion element 20, and the detected voltage is supplied to an A/D converter 25. By this A/D converter, the detected voltage is converted into a digital signal.

The digital signal output from the A/D converter 25 is stored in a memory circuit 26 as a measurement value. The sampling operation by the A/D converter 25 is executed in synchronism with the sampling clocks generated by a sampling clock circuit 29. In synchronism therewith, the measurement value stored in the memory circuit 26 is read out and supplied to an image processing means 32, for conversion processing. In the present embodiment, a generally-known photomultiplier is employed as the photoelectric conversion element 20. The sensitivity of this photoelectric conversion element 20 can be adjusted by varying the voltage applied thereto.

A detailed operation and advantage of the above light-measuring circuit will be described.

In the light-measuring circuit, measurement light from the sample 9 is incident on the photoelectric converting element 20. The measurement light is converted into an electric signal in accordance with the amount thereof and the sensitivity of the photoelectric converting element 20, and the resultant electric signal is supplied to the amplifier 21. After being amplified, the electric signal is supplied to the feedback circuit 22, by which it is compared with the reference signal 30. Results of this comparison are fed back to the photoelectric converting element 20 by way of the higher-potential power supply. Accordingly, the output signal from the amplifier 21 is controlled such that it has the same level as the reference signal 30 output from the D/D converter 28 at all times.

When the output signal level of the amplifier 21 is lower than the level of the reference signal 30, the feedback circuit 22 supplies the higher-potential power supply 23 with a voltage setting signal that increases the sensitivity of the photoelectric converting element 20. Conversely, when the output signal level of the amplifier 21 is higher than the level of the reference signal 30, the feedback circuit 22 supplies the higher-potential power supply 23 with a voltage setting signal that decreases the sensitivity of the photoelectric converting element 20.

The feedback control includes the control of proportion, differentiation, integration, etc., and what should be subjected to feedback control has to be determined in consideration of the characteristics of the system that is from the photoelectric converting element 20 to the higher-potential power supply 23.

The reference signal 30 mentioned above is determined by the digital value supplied from the control CPU 27 to the D/A converting element 28. Preferably, the digital value is determined in such a manner that the relationship between the current output from the photoelectric converting element 20 and the amount of light input to the photoelectric converting element 20 is in the range where it can be depicted as being linear.

This feature will be explained in more detail. In the present embodiment, the photoelectric converting element 20 is made of a photomultiplier. In this case, the characteristic of the output current determined in relation to the amount of light input to the photomultiplier is such as that shown in the graph in FIG. 3. In the case of this photomultiplier, the output current varies in accordance with the voltage applied to the photomultiplier, as indicated by the broken lines in FIG. 3. The range indicated by reference symbol a is a range where the output current is linear with reference to the amount of light input to the photomultiplier.

Figure 4:
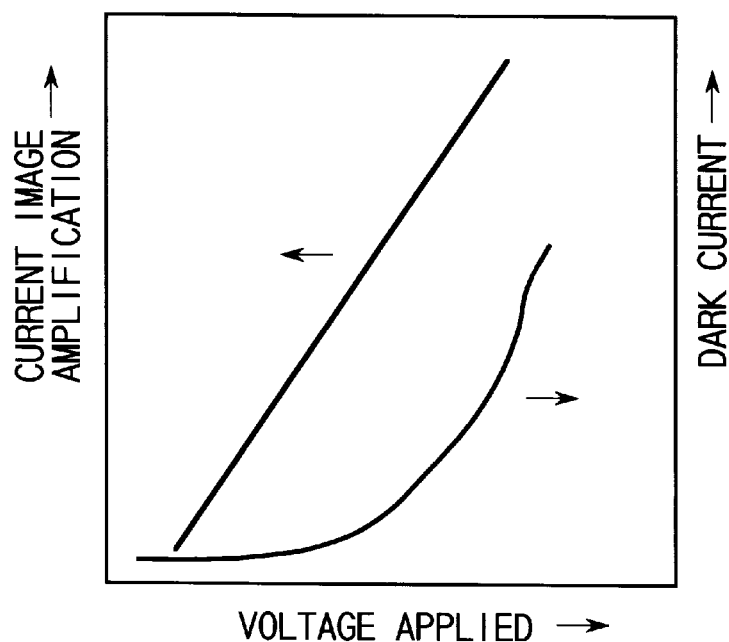
FIG. 4 is a graph how the sensitivity characteristic and the dark-current output characteristic are related with the voltage applied to the photomultiplier.

In the case of the photoelectric multiplier, the current amplification factor (which can be regarded as meaning the "sensitivity") changes in accordance with the voltage applied by the higher-potential power supply 23, as indicated by the straight line in the graph of FIG. 4. It should be noted that the value of the dark current (i.e., the current output from the photomultiplier when the amount of light incident thereon is zero) increases in accordance with an increase in the voltage applied, as indicated by the curved line in the graph of FIG. 4.

Figure 3:
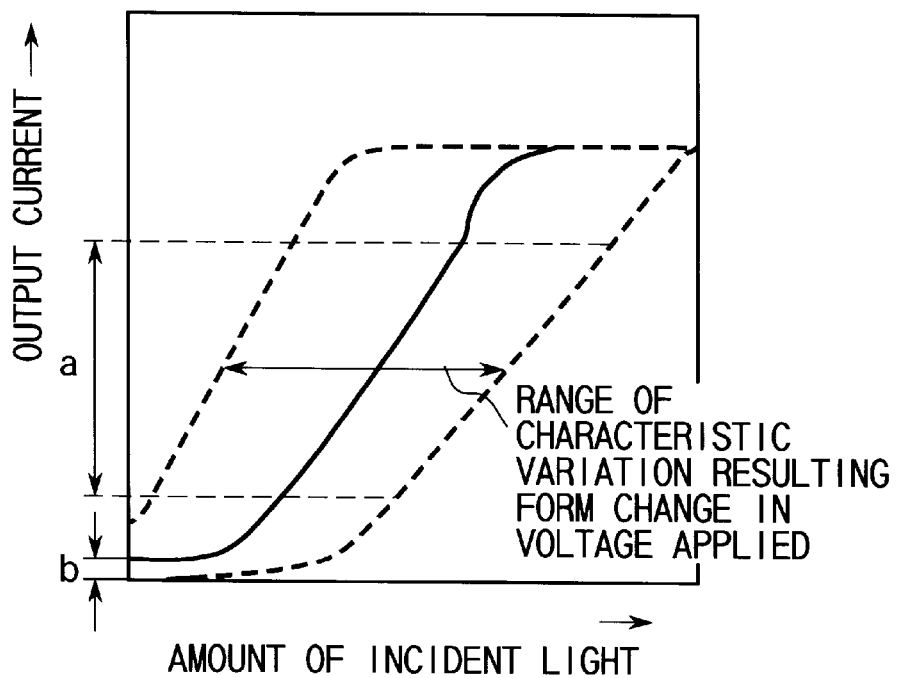
FIG. 3 is a graph showing how the output current characteristic is related with the amount of light incident on a photomultiplier.

Let us assume that the photoelectric multiplier has such output characteristics as are indicated by the solid lines in the graph of FIG. 3. The dark current generated in this case is indicated by reference symbol b.

As can be seen from the above, when the reference value is determined, the range a where the output characteristic is linear should be determined in consideration of the dark current, particularly the dark current generated when the power provided by the higher-potential power supply is close to the upper limit. In other words, the range a where the output characteristic is linear is determined in consideration of the dark current, and an ideal reference value is determined on the basis of the output current (the output voltage of the amplifier 21) corresponding to the range a.

The output voltage of the higher-potential power supply 23 is determined on the basis of the reference signal 30 in the manner mentioned above. The output voltage is sampled by means of the voltage-dividing circuit 24 and the A/D converter 25, and the resultant digital data is stored in the memory circuit 26. The sampling operation is performed in synchronism with the clocks generated by the sampling clock circuit.

The frequency of the sampling clocks is determined in consideration of a variety of factors, such as the response speed of the feedback system, the speed of the X-direction scanner 4, and the image resolution required (the number of pixels required), etc.

The data stored in the memory circuit 26 in the above manner serves as sensitivity data of the photoelectric converting element 20 and corresponds to each of the pixels. In other words, the data stored in the memory circuit 26 represents the sensitivity of the photoelectric converting element 20. For example, the data shows that the sensitivity is low at sample portions which look bright and is high at sample portions which look dark.

If the data stored in the memory circuit 26 is displayed on a display means 30 as it is, the image of the sample 9 will look dark at bright sample portions and look bright at dark sample portions. That is, the displayed image may be like a negative image of the sample.

To solve this problem, the control CPU 27 controls the image processing means 32 so that the data stored in the memory circuit 26 and representing the sensitivity of the photomultiplier 20 is converted into data that corresponds to the amount of input light.

In the case where a photomultiplier is employed as the photoelectric converting element 20, the sensitivity G (x, y) at each pixel is expressed by the following formula:

$$G(x, y) = a \cdot V(x, y)^\alpha \quad (1)$$

where V (x, y) is data stored in the memory circuit 26 (i.e., the value of the power provided by the higherpotential power supply), α is a coefficient determined by the structure of the photomultiplier, and a is a constant.

The relative light amount I (x, y) at each pixel can be calculated by the following formula:

$$I(x, y) = Iref/G(x, y)$$
$$= b \cdot Iref/V(x, y)\alpha \quad (2)$$

where Iref is a reference signal and b is a constant.

The control CPU 27 calculates the amount of input light with respect to each of the pixels on the basis of the above formula. If the amount of data which must be processed per unit time is large or if a higher processing speed is required, it is preferable that a data processing circuit 31 be additionally employed (the data processing circuit 31 is shown in FIG. 1, with its data input and output lines being depicted by the broken lines). Where the data processing circuit 31 is provided, the calculation mentioned above may be performed when data is stored in the memory circuit 26.

Owing to the structures described above, the following advantages are available.

In the present embodiment, the sensitivity of the photoelectric converting element 20 is subjected to feedback control so that the output current of the photoelectric converting element 20 can coincide with the value of the reference signal, and sensitivity data obtained thereby is stored in the memory circuit 26 and used as light amount information. In addition, the sensitivity (amplification factor) of the photoelectric converting element 20 includes information corresponding to the intensity of signal light, as indicated in the above formulas. Hence, a measurement value corresponding to the density information on a sample under measurement can be obtained by use of the sensitivity data stored in the memory circuit 26.

With this structure, it is not necessary to adjust or determine measurement parameters, as in the conventional laser scan microscope. Moreover, a wide dynamic range is available at the time of measurement. In other words, adjustment can be performed by making the best use of the sensitivity adjustment range of the photoelectric converting element.

In the first embodiment mentioned above, the sensitivity data stored in the memory circuit 26 is a digital signal which the A/D converter 25 produces by performing A/D conversion with respect to an output of the higher-potential power supply 23. However, if the characteristic relationships between the sensitivity setting signal supplied from the feedback circuit 22 to the higher-potential power supply 23 and the output of the higher-potential power supply 23 are known beforehand, as well as the delay times predetermined for them, the sensitivity setting signal output from the feedback circuit 22 may be supplied to the A/D converter 25, for direct conversion of the sensitivity setting signal. In this case, a digital signal obtained by this direct conversion is stored in the memory circuit 26 as sensitivity data.

(Second Embodiment)

A light-measuring apparatus according to the second embodiment of the present invention will now be described.

Figure 5:
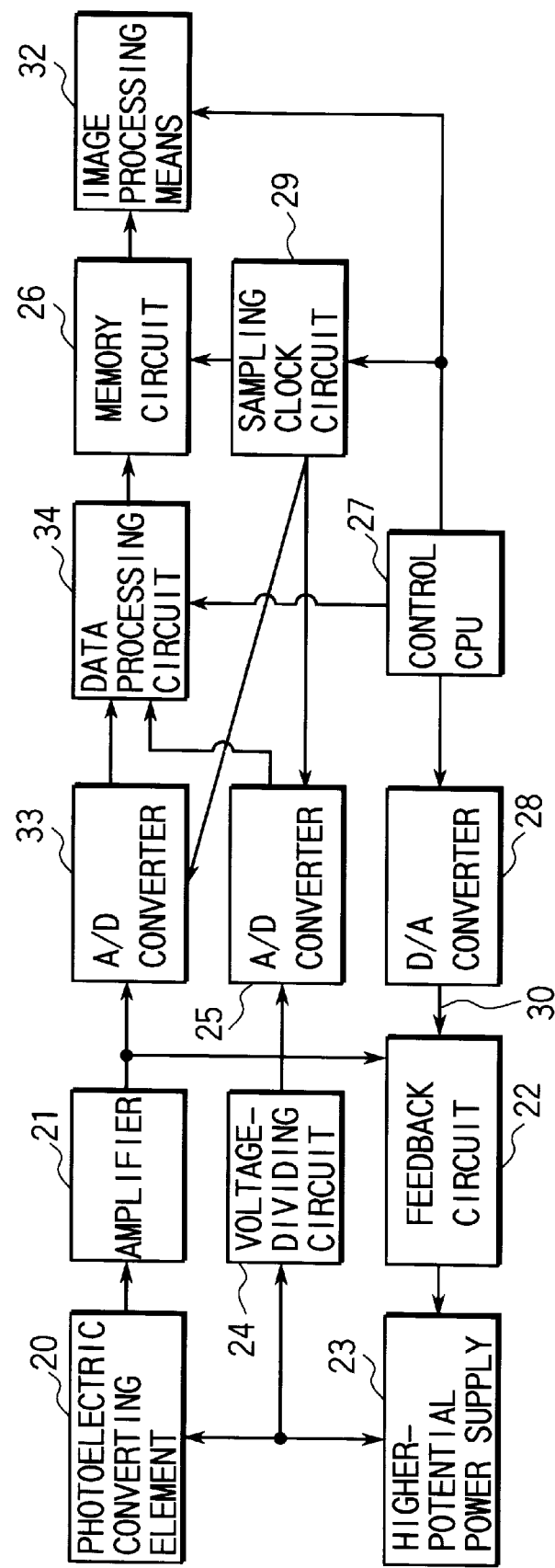
FIG. 5 is a block circuit diagram of a light-measuring circuit according to the second embodiment of the present invention.

FIG. 5 is a block circuit diagram showing the light-measuring apparatus of the second embodiment. In FIG. 5, the same reference numerals as used in FIG. 1 represent corresponding structural elements, and an explanation of them will be omitted herein.

As noted above with reference to the first embodiment, the frequency of the sampling clocks (which determines the measurement speed of the system) is dependent on the response speed of the feedback loop including a photoelectric converting element 20, an amplifier 21, a feedback circuit 22, and a higher-potential power supply 23. In general, the response speeds of a photomultiplier (used as the photoelectric converting element 20), the amplifier 21 and the feedback circuit 22 are expressed in terms of micro seconds, while the response speed of the higher-potential power supply 23 is expressed in terms of milli-seconds.

With this in mind, the second embodiment has been developed. As can be seen from FIG. 5, the second embodiment samples not only the output voltage of the higher-potential power supply (which voltage determines the sensitivity of the photomultiplier 20) but also a measurement value.

In comparison with the structure of the first embodiment, the second embodiment additionally employs an A/D converter 33 and a data processing circuit 34. The A/D converter 33 samples an output signal of the amplifier 21, for A/D conversion, and the data processing circuit 34 processes the sampled signal supplied from both A/D converters 25 and 33.

In regard to the method in which the amount of light is calculated on the basis of the output voltage of the higher-potential power supply, reference was already made to it by use of formulas (1) and (2) in describing the first embodiment. Therefore, the following description will be given only of the method in which the amount of light is calculated on the basis of the output value of the amplifier 21.

As described above with reference to the first embodiment, the output signal of the photoelectric converting element 20 varies linearly with reference to the amount of input light before and after the supply of a reference value. Therefore, the relative light amount I (x, y) at any arbitrary point can be calculated by formula (3) below, $$I(x, y) = S(x, y)/V(x, y)^\alpha \quad (3)$$

where S(x, y) is an output which the amplifier 21 produces with respect to the arbitrary point, V (x, y) is a sensitivity which the photomultiplier has at the time (i.e., the output voltage value of the higher-potential power supply), and a is a coefficient determined by the structure of the photomultiplier.

The data processing circuit 34 executes calculations based on formulas (1)–(3), and a measurement value obtained thereby is stored in the memory circuit 26. In other words, the data processing circuit 34 calculates the amount of light on the basis of measurement data supplied from the amplifier 21 (which has a high response speed) and the data on the sensitivity which the photomultiplier 20 has when the measurement data is obtained. In this manner, the light-measuring apparatus of the second embodiment enables measurement which can cope with high-speed variations in the light to be measured.

According to the second embodiment, it is not necessary to adjust or determine measurement parameters, a wide dynamic range is available at the time of measurement, and the measurement itself can be made at high speed.

In the two embodiments mentioned above, the photoelectric converting element 20 is made of a photomultiplier. Needless to say, however, the present invention is in no way restricted to this. The photoelectric converting element 20 may be made of any type of sensitivity-variable element, such as an avalanche diode. In addition, even an element whose sensitivity cannot be varied, such as a photodiode or a phototransistor, can be employed. In this case, the amplifier 21 is designed to have a variable amplification factor, and advantages similar to those mentioned above are obtained in this case as well.

Moreover, the feedback circuit 22 may be connected to the output terminals of the A/D converters 25 and 33. The advantages mentioned above remain unchanged in this case as well.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A laser scan microscope which irradiates a sample with a laser beam while simultaneously scanning the laser beam over the sample and processes an optical signal obtained thereby so as to obtain image data, said laser scan microscope comprising:

photoelectric converting means for converting an optical signal from the sample into an electric signal;

sensitivity adjusting means for adjusting a sensitivity of the photoelectric converting means such that an output value of the photoelectric converting means becomes closer to a predetermined reference value; and processing means for sampling sensitivity information determined for the photoelectric converting means, in accordance with a scanning speed, and for converting the sampled sensitivity information into a light measurement value based on the predetermined reference value, said sensitivity information being determined based on a signal corresponding to a voltage applied to the photoelectric converting means, and said light measurement value being used for obtaining the image data.

2. A laser scan microscope according to claim 1, wherein said sensitivity adjusting means includes reference value signal generating means for generating the predetermined reference value such that the sensitivity of the photoelectric converting means is permitted to fall within such a range that a relationship between the voltage applied to the photoelectric converting means and a voltage output from the photoelectric converting means is linear.

3. A laser scan microscope according to claim 1, wherein said sensitivity adjusting means includes a feedback circuit for making a comparison between the output value of the photoelectric converting means and the predetermined reference value, and for controlling the voltage applied to the photoelectric converting means based on the comparison.

4. A laser scan microscope according to claim 1, wherein said processing means converts the sampled sensitivity information into the light measurement value also based on a signal corresponding to a voltage output from the photoelectric converting means.

5. A laser scan microscope according to claim 1, wherein said processing means includes:

a voltage detecting circuit for detecting an output voltage from a higher-potential power supply;

an A/D converting circuit for performing A/D conversion with respect to the output voltage detected by the voltage detecting circuit; and a processor for sampling voltage data output from the A/D converting circuit and converting the sampled data into a measurement value representing a relative amount of light, based on the predetermined reference value.

6. A light-measuring apparatus comprising:

photoelectric converting means for converting an optical signal into an electric signal;

sensitivity adjusting means for adjusting a sensitivity of the photoelectric converting means such that an output value of the photoelectric converting means becomes closer to a predetermined reference value; and processing means for converting sensitivity information determined for the photoelectric converting means into a light measurement value based on the predetermined reference value said sensitivity information being determined based on a signal corresponding to a voltage applied to the photoelectric converting means, and said light measurement value being used for obtaining image data.

7. A laser scan microscope according to claim 6, wherein said sensitivity adjusting means includes reference value signal generating means for generating the predetermined reference value such that the sensitivity of the photoelectric converting means is permitted to fall within such a range that a relationship between the voltage applied to the photoelectric converting means and a voltage output from the photoelectric converting means is linear.

8. A laser scan microscope according to claim 6, wherein said sensitivity adjusting means includes a feedback circuit for making a comparison between the output value of the photoelectric converting means and the predetermined reference value, and for controlling the voltage applied to the photoelectric converting means based on the comparison.

9. A laser scan microscope according to claim 6, wherein said processing means converts the sensitivity information into the light measurement value also based on a signal corresponding to a voltage output from the photoelectric converting means.

10. A laser scan microscope according to claim 9, wherein said processing means includes:

a voltage detecting circuit for detecting an output voltage from a higher-potential power supply;

an A/D converting circuit for performing A/D conversion with respect to the output voltage detected by the voltage detecting circuit; and a processor for sampling voltage data output from the A/D converting circuit and converting the sampled data into a measurement value representing a relative amount of light, based on the predetermined reference value.

* * * * *